(12) United States Patent
Ryu et al.

(10) Patent No.: US 11,436,306 B2
(45) Date of Patent: Sep. 6, 2022

(54) IDENTIFICATION INFORMATION MANAGEMENT METHOD AND ELECTRONIC DEVICE SUPPORTING SAME

(71) Applicant: Samsung Electronics Co., Ltd., Gyeonggi-do (KR)

(72) Inventors: Young Hwan Ryu, Gyeonggi-do (KR); Dong Ho Jang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 432 days.

(21) Appl. No.: 16/484,485

(22) PCT Filed: Feb. 21, 2018

(86) PCT No.: PCT/KR2018/002137
§ 371 (c)(1),
(2) Date: Aug. 8, 2019

(87) PCT Pub. No.: WO2018/155905
PCT Pub. Date: Aug. 30, 2018

(65) Prior Publication Data
US 2020/0004937 A1 Jan. 2, 2020

(30) Foreign Application Priority Data
Feb. 21, 2017 (KR) .................. 10-2017-0022725

(51) Int. Cl.
*G06F 21/00* (2013.01)
*G06F 21/31* (2013.01)
(Continued)

(52) U.S. Cl.
CPC ................ *G06F 21/31* (2013.01); *G06F 8/61* (2013.01); *G06F 11/1469* (2013.01);
(Continued)

(58) Field of Classification Search
CPC ........ G06F 21/31; G06F 8/61; G06F 11/1469; G06F 21/44; H04L 63/0823; H04M 1/72406; H04N 5/3741
See application file for complete search history.

(56) References Cited

U.S. PATENT DOCUMENTS 8,327,133 B2   12/2012   Ohara
10,257,177 B2   4/2019   Hwang et al.
(Continued)

FOREIGN PATENT DOCUMENTS

JP       2007-274434 A   10/2007
KR   10-2006-0097161 A    9/2006
(Continued)

OTHER PUBLICATIONS

R. Stanciu et al., A Self-Configurable Real-Time Video Surveillance System with Distributed IP-Cameras, Oct. 4, 2012, IEEE, pp. 1-6. (Year: 2012).*
(Continued)

*Primary Examiner* — Luu T Pham
*Assistant Examiner* — Fahimeh Mohammadi
(74) *Attorney, Agent, or Firm* — Cha & Reiter, LLC

(57) ABSTRACT

Disclosed is an electronic device including a communication module that performs communication with at least one external device, a memory that stores a list in which identification information for at least one security application involving user authentication is listed, a processor electrically connected to the communication module and the memory, wherein the processor transmits information for factory reset to at least one external device associated with the security application based on the identification information on the list when a factory reset event of the electronic device occurs. In addition, various embodiments understood through the disclosure may be possible.

7 Claims, 13 Drawing Sheets

(51) Int. Cl.
*G06F 8/61* (2018.01)
*G06F 11/14* (2006.01)
*G06F 21/44* (2013.01)
*H04L 9/40* (2022.01)
*H04N 5/374* (2011.01)
*H04M 1/72406* (2021.01)

(52) U.S. Cl.
CPC .......... *G06F 21/44* (2013.01); *H04L 63/0823* (2013.01); *H04M 1/72406* (2021.01); *H04N 5/3741* (2013.01)

(56) References Cited

U.S. PATENT DOCUMENTS

| | | | | |
|---|---|---|---|---|
| 2007/0234059 | A1* | 10/2007 | Ohara | H04L 9/3271 |
| | | | | 713/176 |
| 2011/0276683 | A1* | 11/2011 | Goldschlag | H04W 12/088 |
| | | | | 709/224 |
| 2012/0238206 | A1* | 9/2012 | Singh | H04W 12/086 |
| | | | | 455/41.1 |
| 2012/0272231 | A1 | 10/2012 | Kwon et al. | |
| 2013/0132528 | A1* | 5/2013 | Enomoto | G06F 15/16 |
| | | | | 709/219 |
| 2014/0143862 | A1* | 5/2014 | Chaturvedi | G06F 11/1461 |
| | | | | 726/19 |
| 2015/0095999 | A1* | 4/2015 | Toth | H04L 63/0823 |
| | | | | 726/6 |
| 2015/0143125 | A1* | 5/2015 | Nix | H04L 12/2854 |
| | | | | 713/171 |
| 2015/0193224 | A1* | 7/2015 | Ziat | H04W 12/35 |
| | | | | 717/172 |
| 2015/0312041 | A1* | 10/2015 | Choi | H04L 63/0861 |
| | | | | 713/175 |
| 2016/0065557 | A1 | 3/2016 | Hwang et al. | |
| 2016/0103675 | A1* | 4/2016 | Aabye | G06F 9/4451 |
| | | | | 717/170 |
| 2016/0140358 | A1* | 5/2016 | Lee | G06F 15/16 |
| | | | | 726/19 |
| 2016/0154982 | A1* | 6/2016 | Velusamy | H04L 63/20 |
| | | | | 455/411 |
| 2016/0253651 | A1* | 9/2016 | Park | G06Q 20/34 |
| | | | | 705/39 |
| 2017/0064549 | A1* | 3/2017 | Rykowski | H04L 67/34 |
| 2017/0337390 | A1* | 11/2017 | Hamilton | H04L 9/0861 |
| 2018/0096174 | A1* | 4/2018 | Finger | G06F 21/629 |
| 2018/0191501 | A1* | 7/2018 | Lindemann | H04L 9/0833 |

FOREIGN PATENT DOCUMENTS

| | | |
|---|---|---|
| KR | 10-2013-0027056 A | 3/2013 |
| KR | 10-2013-0113811 A | 10/2013 |
| KR | 10-2016-0026582 A | 3/2016 |
| WO | 2016/035299 A1 | 3/2016 |

OTHER PUBLICATIONS

Aleksandr Ometov, Facilitating the Delegation of Use for Private Devices in the Era of the Internet of Wearable Things, Jul. 21, 2016, IEEE, pp. 843-854. (Year: 2016).*

Dali Zhu et al., A Dynamic Credible Factory Reset Mechanism of Personal Data in Android Device, Dec. 3, 2015, IEEE, pp. 990-998. (Year: 2015).*

Susan Moran, Security for Mobile ATE Applications, Oct. 22, 2012, IEEE, pp. 1-5. (Year: 2012).*

* cited by examiner

IDENTIFICATION INFORMATION MANAGEMENT METHOD AND ELECTRONIC DEVICE SUPPORTING SAME

CROSS REFERENCE TO RELATED APPLICATIONS

This application is a National Phase Entry of PCT International Application No. PCT/KR2018/002137, which was filed on Feb. 21, 2018, and claims a priority to Korean Patent Application No. 10-2017-0022725, which was filed on Feb. 21, 2017, the contents of which are incorporated herein by reference.

TECHNICAL FIELD

Various embodiments disclosed herein relate to information management techniques in accordance with a factory reset of an electronic device.

BACKGROUND ART

Recently, with the rapid spread of electronic devices equipped with proprietary operating systems, the electronic devices provide various functions for a user's convenience. Furthermore, with the advent of the ubiquitous era, the electronic devices enable real-time utilization of various information resources. For example, an electronic device may construct a mobile banking service system with financial institutions to support the processing of financial transactions that are unrestricted in time and space.

When operating a mobile banking service, it may be required to input or transmit and receive sensitive or private information resources such as login information, user personal information or financial transaction information. Accordingly, the mobile banking service system may require thorough security maintenance, and in recent years, establish a high level security policy based on the biometric certification information based on the user's physical or behavioral characteristics.

DISCLOSURE

Technical Problem

The electronic device may perform so-called factory reset in which various data stored in a memory is deleted and restored to a state at the time of factory shipment according to various operating environments. The factory reset may delete unnecessary data to suppress the decline of the performance of the electronic device or to prevent leakage of security information. However, a problem of non-synchronization with an external device (e.g., an external device related to the electronic device is unable to recognize the factory reset of the electronic device) may occur on the back of the factory reset, which may adversely affect normal interaction between the electronic device and the external device.

Various embodiments disclosed herein may provide an identification information management method and an electronic device supporting the same, which provide information for factory reset to an external device associated with the electronic device in the case of the factory reset of the electronic device to achieve information synchronization and efficient interaction between the both devices.

Technical Solution

An electronic device according to an embodiment includes a communication module that performs communication with at least one external device, a memory that stores a list in which identification information for at least one security application involving user authentication is listed and a processor electrically connected to the communication module and the memory.

According to an embodiment, the processor may transmit information for factory reset to at least one external device associated with the security application based on the identification information on the list when a factory reset event of the electronic device occurs.

Advantageous Effects

According to various embodiments, it is possible to stably operate a system constructed between an electronic device and a relevant external device by providing a notification for factory reset to the external device when the factory reset of the electronic device is performed.

In addition, various effects can be provided that are directly or indirectly understood through this document.

MODE FOR INVENTION

Figure 1:
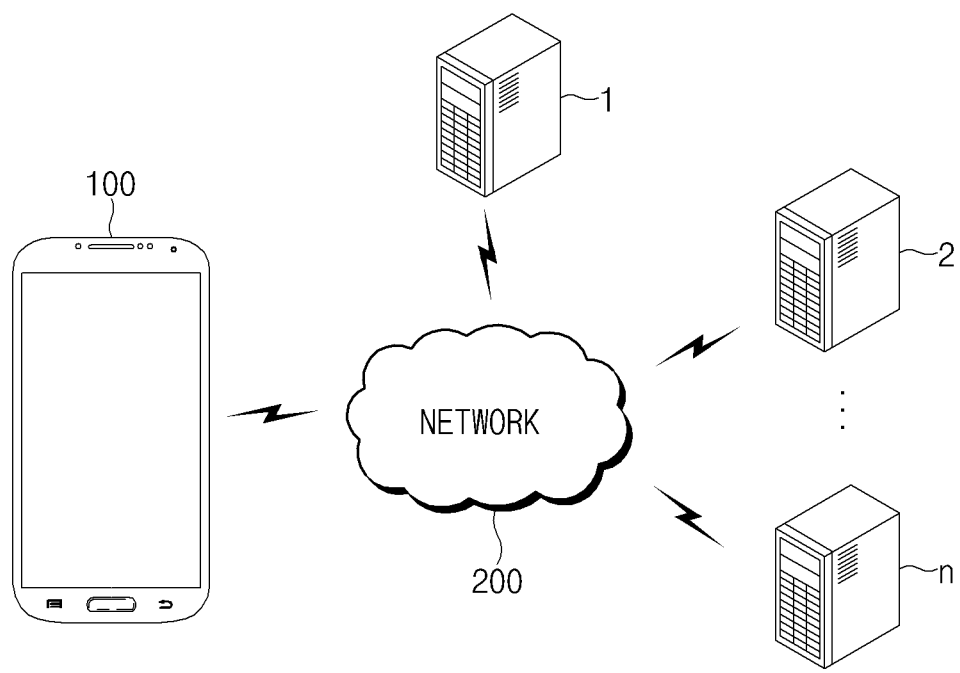
FIG. 1 is a diagram showing an operating environment of an electronic device according to an embodiment.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when a component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

FIG. 1 is a diagram showing an operating environment of an electronic device according to an embodiment.

Referring to FIG. 1, an electronic device 100 (e.g., an electronic device 601 in FIG. 6 or an electronic device 701 in FIG. 7) may establish a network 200 (e.g., a network 662 in FIG. 6) in cooperation with at least one external device 1 to n (e.g., an external device 300 in FIG. 2A, or an electronic device 604 or a server 606 in FIG. 6) and may be electrically or communicationally connected to the at least one external device 1. The electronic device 100 may interact with the at least one external device 1 to n by connecting to the network 200 based on wired or wireless communication. For example, the electronic device 100 may download a certain application from a first external device 1 (e.g., an application store server) corresponding to user control or specified scheduling information, and transmit and receive data with at least one second external device 2 to n (e.g., an application developer server) related to of the application.

In one embodiment, at least one application installed in the electronic device 100 (or downloaded from the first external device 1) may include a security application that may be accessed or operated based on user authentication (e.g., a mobile banking application). In this regard, the electronic device 100 and the second external devices 2 to n associated with the security application may construct a user authentication system based on biometric information of a user of the electronic device 100, for example. In one embodiment, the user authentication system may involve the operation of a biometric certificate defined between the electronic device 100 and the second external devices 2 to n. For example, the electronic device 100 may request the second external devices 2 to n to generate a biometric certificate based on biometric information registered by the user (e.g., physical characteristic information (e.g., iris, retina, fingerprint, face or palm lines), or behavioral characteristic information (voice or handwriting)) and receive the biometric certificate according to the approval of the second external devices 2 to n. In various embodiments, the above-described certificate is not limited to the application of user biometric information, but may include various platforms capable of performing user authentication based on security data related to the user (e.g., digital signature information of a user, serial number or pin code assigned to the user).

In one embodiment, a state change in the certificate may occur depending on the operating environment of the electronic device 100. For example, when a factory reset (or settings or system reset of the electronic device 100) is performed on the electronic device 100, data for at least a portion of the certificate stored in the electronic device 100 may be lost or uninstalled. The certificate contributes to the stable operation of the above-described user authentication system, and there is a need to perform proper information synchronization for operation of the certificate through the interaction between the electronic device 100 and the second external devices 2 to n. In this regard, the electronic device 100 may generate a manage list for at least one application which involves the operation of the certificate, and when an event related to the factory reset occurs, provide a notification for performance of the factory reset to a relevant second external devices 2 to n based on the manage list. Various operation embodiments of the manage list and functional operations of the related components of the electronic device 100 will be described below.

Figure 2A:
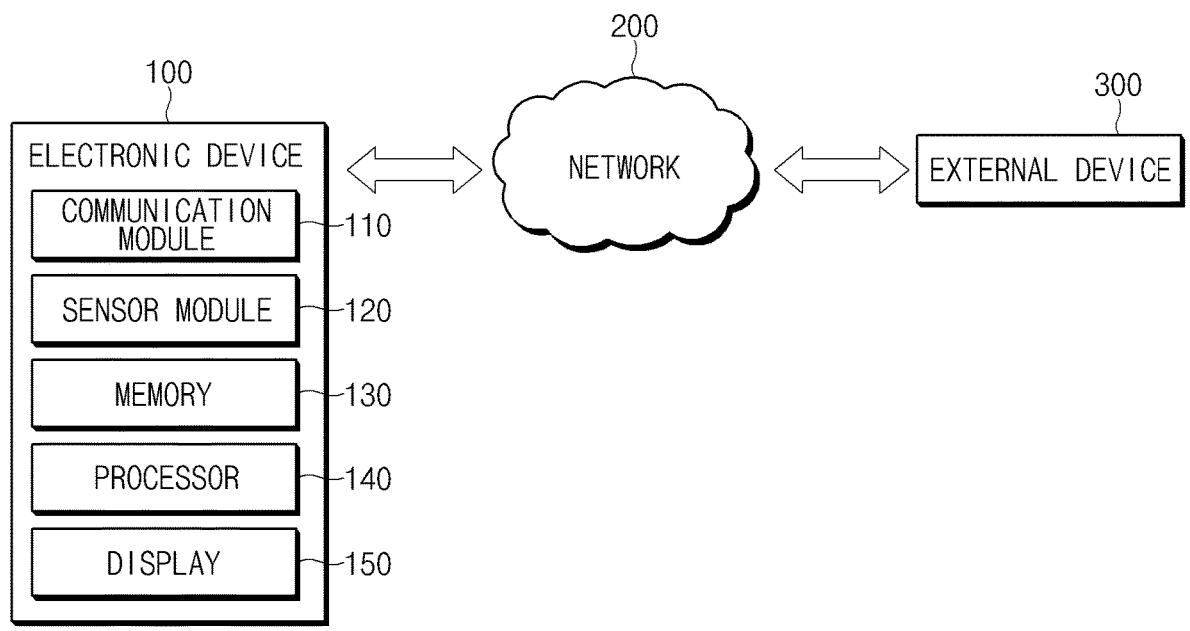
FIG. 2A is a diagram illustrating a configuration of an electronic device according to an embodiment.

FIG. 2A is a diagram illustrating a configuration of an electronic device according to an embodiment.

Referring to FIG. 2A, the electronic device 100 may include at least one of a communication module 110, a sensor module 120, a memory 130, a processor 140, or a display 150. In various embodiments, the electronic device 100 may omit at least one of the components described above, or may additionally include another component. For example, the electronic device 100 may further include a camera module or a microphone module related to performance of a function of the sensor module 120.

The communication module 110 may establish communication with at least one external device 300 (e.g., the first external device 1 and/or the second external devices 2 to n in FIG. 1) based on connection of the network 200. For example, the communication module 110 may establish wired communication or wireless communication with the at least one external device 300 according to a specified protocol. In one embodiment, the communication module 110 may download an application from a specific external device based on the wired communication or wireless communication, or perform transmission and reception of data related to operation of the application with respect to a specific external device.

The sensor module 120 may recognize a user's physical characteristics or analyze the user's behavioral characteristics. In this regard, the sensor module 120 may include at least one of a fingerprint sensor, an iris recognition sensor, a face recognition sensor, a speech recognition sensor, a heart rate measurement sensor, or an image sensor. In various embodiments, the sensor module 120 may receive characteristic information associated with at least a portion of the user's body or characteristic information associated with a behavioral pattern of the user from an external device (e.g., a wearable device) that interacts with the electronic device 100.

The fingerprint recognition sensor may obtain fingerprint information of the user in a line scan or area scan method. For example, the fingerprint recognition sensor may illuminate, with light or irradiate, with ultrasonic waves, the user's body (e.g., a finger) contacting a specified sensing region and collect fingerprint images using reflected light or ultrasonic waves. Alternatively, the fingerprint recognition sensor may collect the fingerprint images based on a change in capacitance due to the user's body in contact with or proximate to the sensing region. The iris recognition sensor may illuminate a user's eye with light using, for example, an infrared camera and analyze the reflected light to recognize the user's iris. For example, the iris recognition sensor may identify an iris region by detecting structural boundaries based on changes in color or brightness of an eyeball. The face recognition sensor may obtain face information by analyzing an image (e.g., still image or video) of the user photographed through the camera module described above. For example, the face recognition sensor may detect a face region of the user in such a manner as to extract a difference in brightness or color or features in the images and compare data (e.g., pixel values) of the detected face region with previously stored face data of the user to recognize the user's face. The speech recognition sensor may extract unique characteristics such as pronunciation and intonation of speech data obtained through, for example, the microphone module and collect speech information of the user through mapping with previously stored user speech data. For example, the heart rate sensor may illuminate, for example, a portion of the user's body with light and measure the amount of light reflected by the amount of a blood flow through a blood vessel. The heart rate sensor may convert a change in the amount of reflected light into an electrical signal, and analyze a pattern in which the electrical signal is changed to calculate a heart rate of the user. The image sensor may perform image analysis on handwriting information of the user input onto the electronic device, and compare the analyzed result with previously stored handwriting information to recognize the handwriting of the user.

The memory 130 may store instructions, programs, or data related to functional operations for the components of the electronic device 100. For example, the memory 130 may include at least one of a security application program (e.g., a mobile banking application) that involves the aforementioned user certificate, an authentication application program that supports biometric authentication of the user, or a reset application program that supports factory reset of the electronic device 100. In one embodiment, the memory 130 may include a trust zone that is accessible based on a specified signal or route. The memory 130 may store user biometric information obtained or collected by the sensor module 120 in at least a part of the trust zone. Alternatively, the memory 130 may store user biometric certification information or authorized certification information generated or issued through interaction between the electronic device 100 and the external device 300 in at least a part of the trust zone. The memory 130 may further store a program (e.g., a knox) functioning as a security platform for the user biometric information, biometric certification information, or authorized certification information.

The processor 140 may be electrically or operatively coupled to other components of the electronic device 100 to perform control, communication operations, data processing, or the like on the components. For example, the processor 140 may generate a manage list for at least one application which the electronic device 100 includes. In one embodiment, the processor 140 may load the manage list into the memory 130 and identify at least one application listed in the manage list when an event for starting factory reset of the electronic device 100 occurs by user control. The processor 140 may transmit information associated with the factory reset of the electronic device 100 to the external device 300 related to the at least one application which is identified.

The display 150 may output various screens related to control for the factory reset of the electronic device 100. For example, the display 150 may output at least one user interface that supports user control for the factory reset. The display 150 may give a specified display effect on the user interface or output another user interface having a conversion relationship, in response to a user input (e.g., touch) applied to at least a portion of the user interface.

Figure 2B:
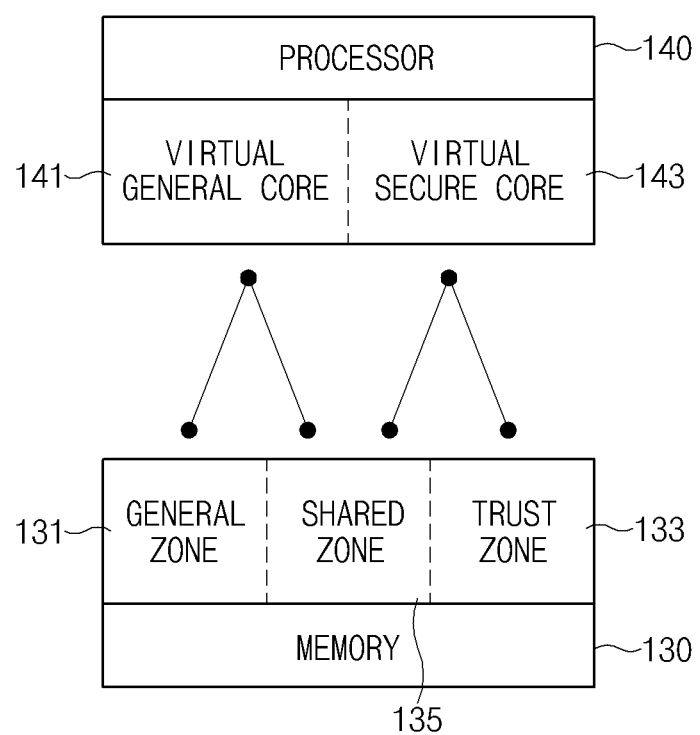
FIG. 2B is a diagram illustrating logical relationships between some of components of an electronic device according to an embodiment.

FIG. 2B is a diagram illustrating logical relationships between some of components of an electronic device according to an embodiment.

In one embodiment, the processor 140 may include a virtual general core 141 and a virtual security core 143 which are logically separated from each other. Alternatively, the processor 140 may include the virtual general core 141 and the virtual security core 143 which are separated from each other in hardware. In this regard, the memory 130 may include at least one logical region corresponding to the virtual core of the processor 140. For example, at least a portion of the memory 130 may be implemented by including a general zone 131 and a trust zone 133 (e.g., a trust zone).

The general zone 131 may include a program that is operable based on the virtual general core 141 of the processor 140. For example, the general zone 131 may include a program in which no separate access restriction is required (e.g., a security application involving user authentication, an authentication application supporting biometric authentication of a user, or a reset application supporting factory reset of an electronic device) and related data. The trust zone 133 may store task instructions or data through the virtual security core 143 of the processor 140. For example, the user biometric information obtained or collected by the sensor module 120 (FIG. 2A) may be stored in the trust zone 133 based on the virtual security core 143 of the processor 140. Alternatively, the user biometric certification information or authorized certification information generated or issued through the interaction between the electronic device 100 (FIG. 2A) and the external device 300 (FIG. 2A) may be stored in the trust zone 133 by the virtual security core 143. In this operation, the processor 140 may activate a specified security platform (e.g., knox) through the virtual security core 143 and perform encrypted storage of the user biometric information, user biometric certification information, or authorized certification information based on the security platform. In various embodiments, the memory 130 may further include a shared zone 135 that is accessible by the virtual general core 141 or the virtual security core 143. In the shared zone 135, memory management information for managing an address space of an operating system stored in the memory 130, for example, and performing resource allocation may be stored.

Figure 2C:
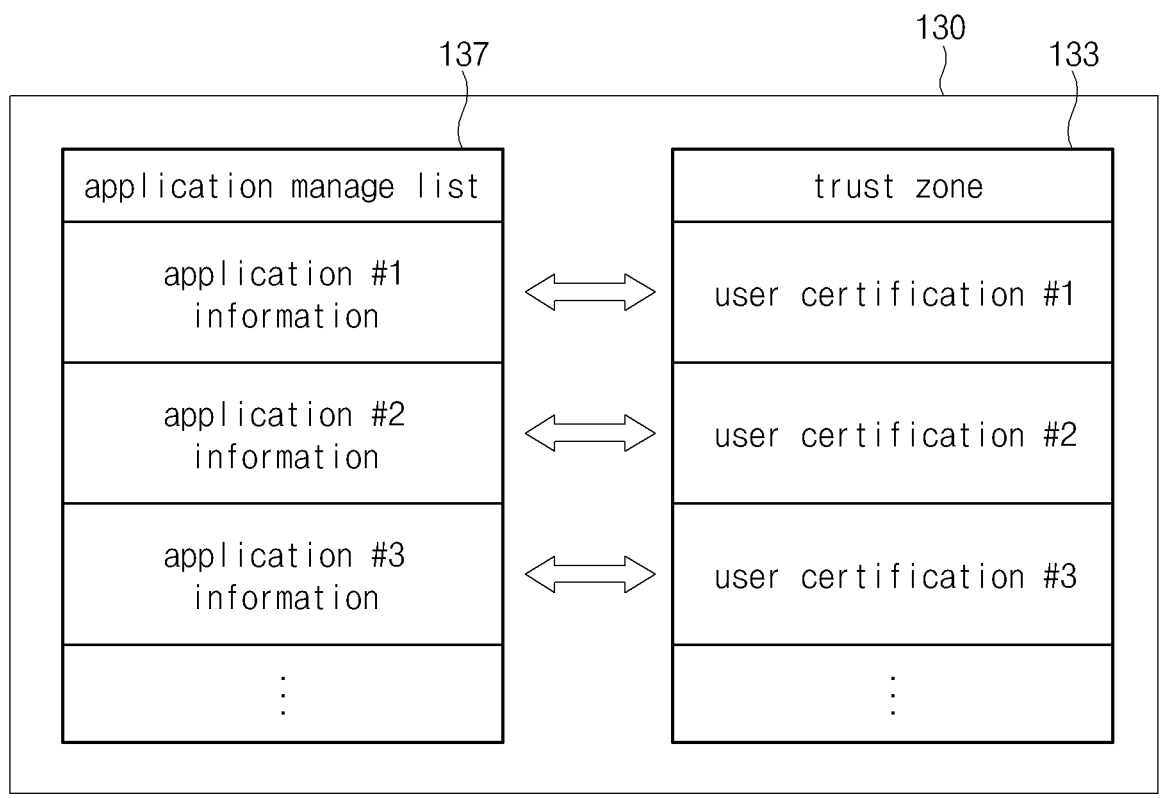
FIG. 2C is a diagram illustrating a manage list of an electronic device according to an embodiment.

FIG. 2C is a diagram illustrating an application manage list of an electronic device according to an embodiment.

Figure 6:
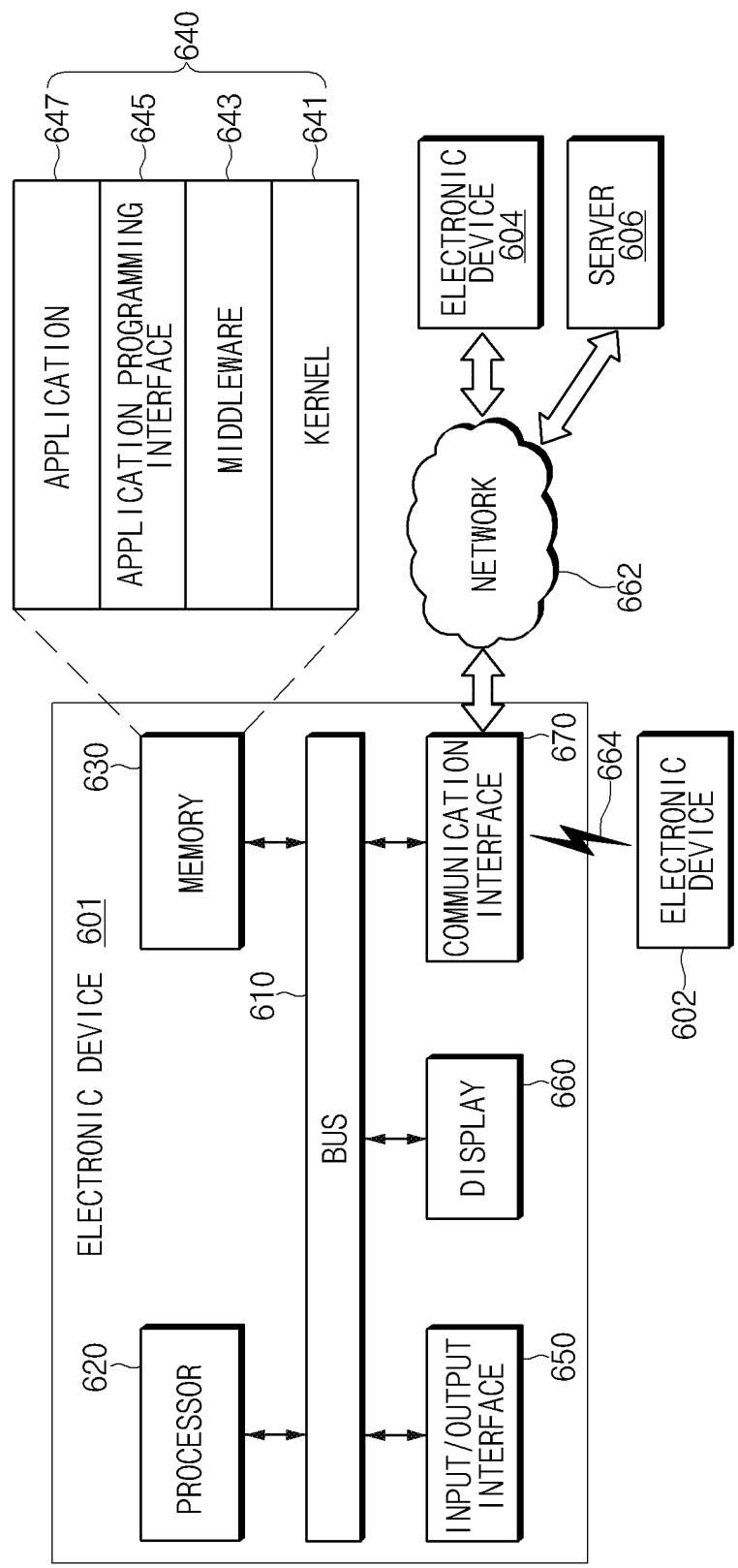
FIG. 6 is a diagram illustrating an electronic device in a network environment according to an embodiment.
Figure 7:
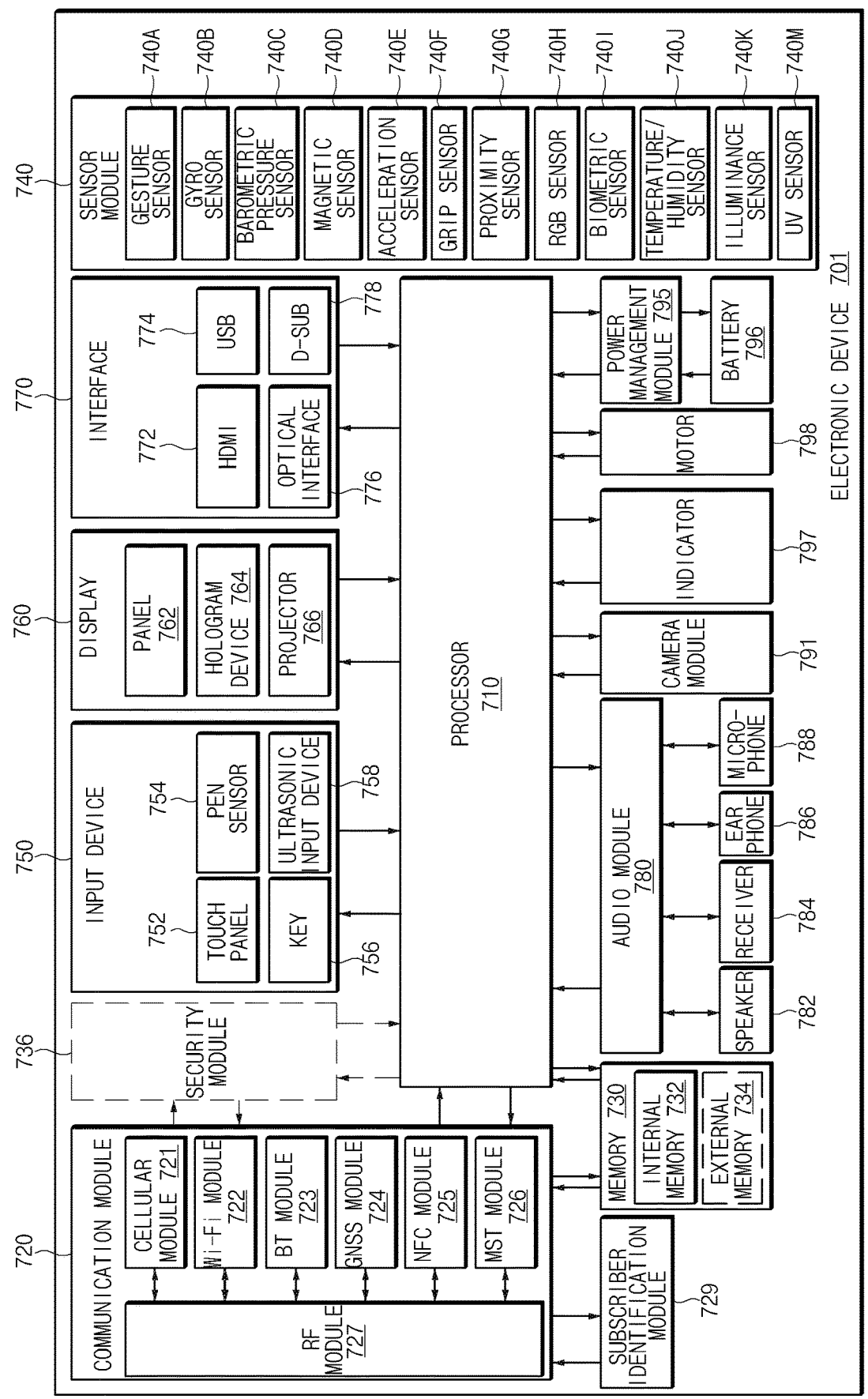
FIG. 7 is a diagram illustrating a block diagram of an electronic device according to an embodiment.

Referring to FIG. 2C, the processor 140 (FIG. 2A) (e.g., a processor 620 of FIG. 6 or a processor 710 of FIG. 7) may generate a manage list 137 for at least one application that has been provided or installed in the electronic device 100 (FIG. 2A) (e.g., an electronic device 601 of FIG. 6, or an electronic device 701 of FIG. 7). The manage list 137 may be stored in the general zone 131 (FIG. 2B), the trust zone 133 (FIG. 2B) or the shared zone 135 (FIG. 2B), which is specified in the memory 130 (e.g., a memory 630 of FIG. 6).

In one embodiment, the manage list 137 may include all of at least one application provided or installed in the electronic device 100. Alternatively, the manage list 137 may include at least one security application involving user authentication (e.g., user biometric authentication). In this case, when user certification (or a certificate) for operating a specific security application is registered through the execution of an authentication application supporting the user authentication (e.g., SAMSUNG PASS or the like), the processor 140 may include the specific security application in the manage list 137. The processor 140 may obtain identification information for at least one application included in the manage list 137 from memory 130 and map at least a part of the identification information (e.g., an application package name, or the like) into a relevant application to list it in the manage list 137.

In one embodiment, the identification information for the security application among at least one piece of identification information listed in the manage list 137 may include user biometric certification information or user authorized certification information stored in the trust zone 133 of the memory 130. In various embodiments, the user biometric certification information or the user authorized certification information corresponding to each of the at least one security application may be different from each other, or at least a part of the application may share the same or similar certification information. For example, a first security application and a second security application may be operated based on the same or similar iris certification information. Alternatively, any one of the first security application and the second security application may be operated based on iris certification information, and the other one may be operated through fingerprint certification information. In one embodiment, when there is at least a pair of security applications sharing the same or similar certification information in the manage list 137, the processor 140 may manage security applications on the manage list 137 according to a specified category (for example, certification information type). The processor 140 may also include, in the identification information of the security application listed in the manage list 137, information relating to whether a process of performing de-authorization of the user certification (or certificate) is necessary in factory reset (or settings reset or system reset) of the electronic device 100.

In one embodiment, the processor 140 may perform update of the manage list 137, depending on an operational status of the electronic device 100 corresponding to user control or specified scheduling information. For example, the processor 140 may reflect an application that is additionally installed in the electronic device 100 or an application that is uninstalled after the installation in the manage list 137.

In one embodiment, the processor 140 may perform loading of the manage list 137 under specified conditions. For example, when a factory reset event occurs for electronic device 100, the processor 140 may load the manage list 137 into memory 130. The processor 140 may perform processing on the loaded manage list 137 according to instructions defined in the authentication application (e.g., SAMSUNG PASS). For example, the processor 140 may identify at least one application or at least one security application on the manage list 137 and transmit information relating to the factory reset of the electronic device 100 to an external device associated with the identified application (300 of FIG. 2A or the second external devices 2 to n of FIG. 1).

Figure 3:
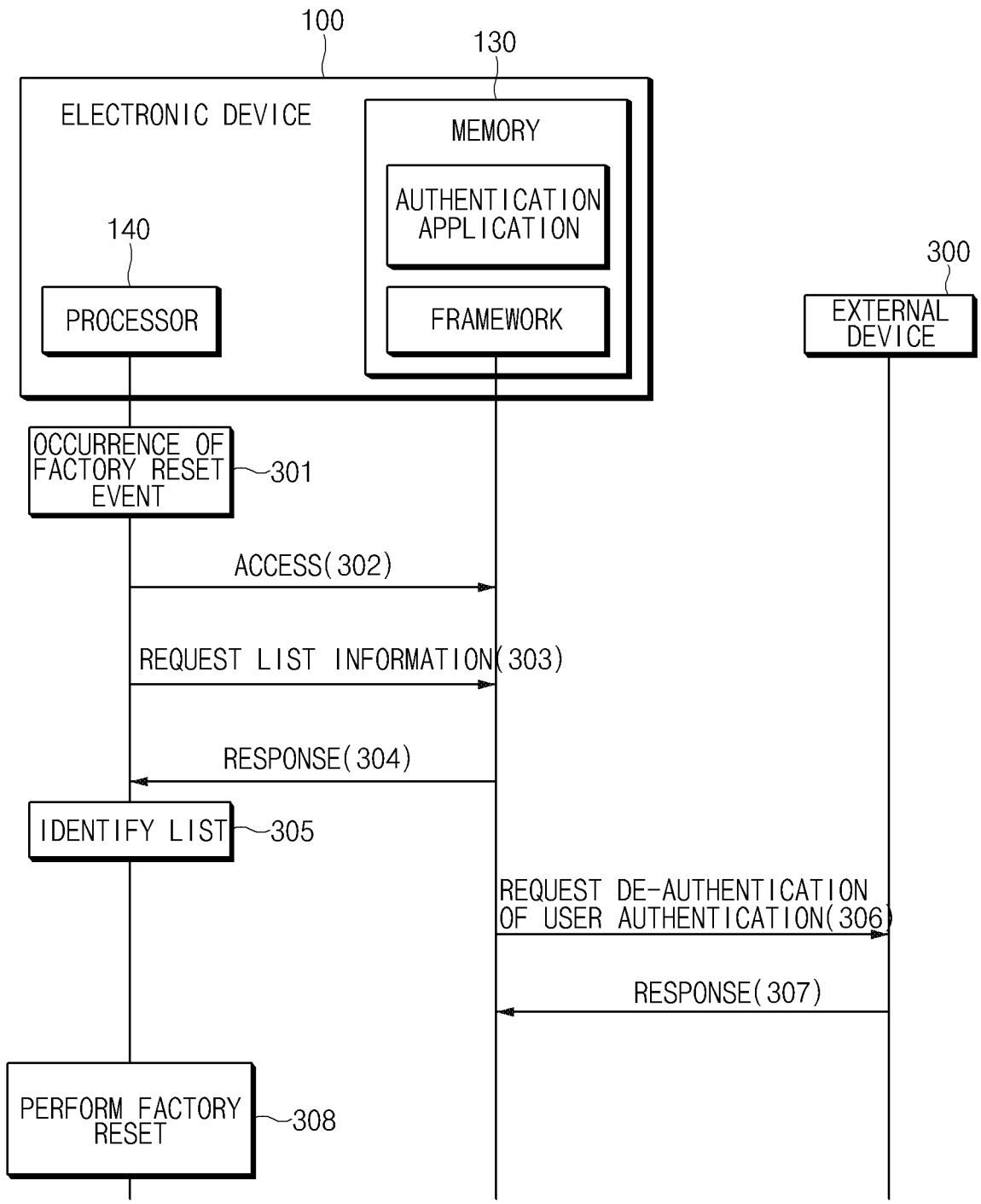
FIG. 3 is a diagram illustrating a signal flow between an electronic device and an external device according to an embodiment.

FIG. 3 is a diagram illustrating a signal flow between an electronic device and an external device according to an embodiment.

Referring to FIG. 3, in operation 301, the processor 140 (e.g., the processor 620 of FIG. 6 or the processor 710 of FIG. 7) of the electronic device 100 may detect occurrence of a factory reset event. For example, when the user controls the factory reset by applying an input (e.g., a touch) to a specified area on a user interface associated with the system settings of the electronic device 100, the processor 140 may detect the factory reset event by receiving a control signal corresponding to the input.

In operation 302, processor 140 may access the memory 130 (e.g., the memory 630 of FIG. 6 or the memory 730 of FIG. 7) in response to the occurrence of the factory reset event. The processor 140 may transfer a signal or instruction associated with the factory reset event to a framework within the memory 130 and the framework may forward the received signal or instruction to an authentication application.

In operations 303 and 304, the processor 140 may request, from the memory 130, information (e.g., address information of the manage list 137 in the area of memory 130) for the manage list 137 (FIG. 2C) and receive a relevant response. In this operation, the processor 140 may call a function for the virtual general core 141 (FIG. 2B) or the virtual security core 143 (FIG. 2B) according to the storage area of the manage list 137 (e.g., the general zone 131 (FIG. 2B), the trust zone 133 (FIG. 2B), or the shared zone 135 (FIG. 2B) in the memory 130).

In operation 305, the processor 140 may load the manage list 137 into the memory 130 and perform processing for the manage list 137 according to instructions defined in the authentication application (e.g., SAMSUNG PASS) in the memory 130. For example, the processor 140 may determine at least one application included in the manage list 137. In this operation, the processor 140 may determine at least one application for which a process of performing de-authorization of the user certification (or certificate) is necessary according to the factory reset of the electronic device 100 by referring to the identification information for the application listed in the manage list 137, and transfer information on the determined application to an authentication application. Alternatively, the processor 140 may transfer information on all applications on the manage list 137 to the authentication application.

In operation 306, the authentication application may transmit first information notifying performance of the factory reset of the electronic device 100 and/or second information requesting de-authorization of the user certification information to the external device 300 (e.g., an application developer server) associated with the received application information under the control of the processor 140. In operation 307, the authentication application may receive a response for the first information and/or the second information from the external device 300 and transfer the response information to the framework.

In operation 308, the processor 140 may initiate the performance of the factory reset of the electronic device 100 by controlling the execution of a reset application with reference to the response information on the framework. In this operation, the processor 140 may collectively delete package data and user certification data for applications included in the manage list 137 on the electronic device 100.

Figure 4A:
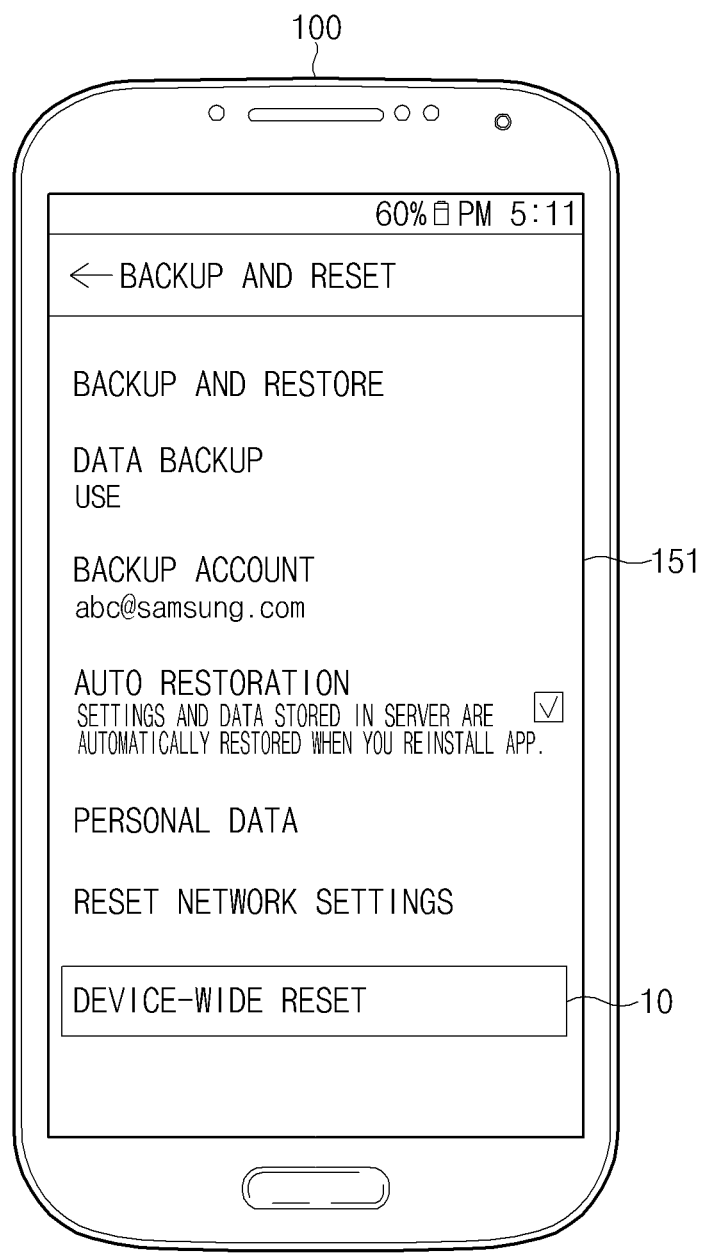
FIG. 4A is a diagram illustrating a first user interface related to factory reset of an electronic device according to an embodiment.
Figure 4B:
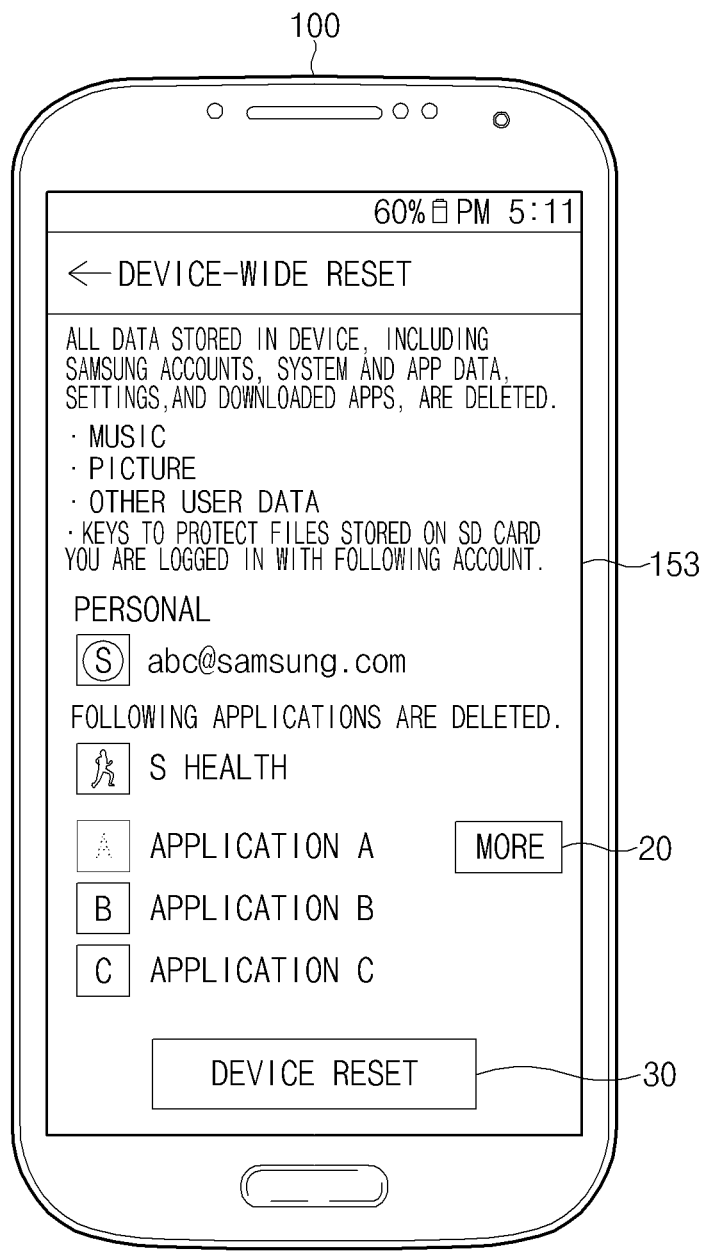
FIG. 4B is a diagram illustrating a second user interface related to factory reset of an electronic device according to an embodiment.
Figure 4C:
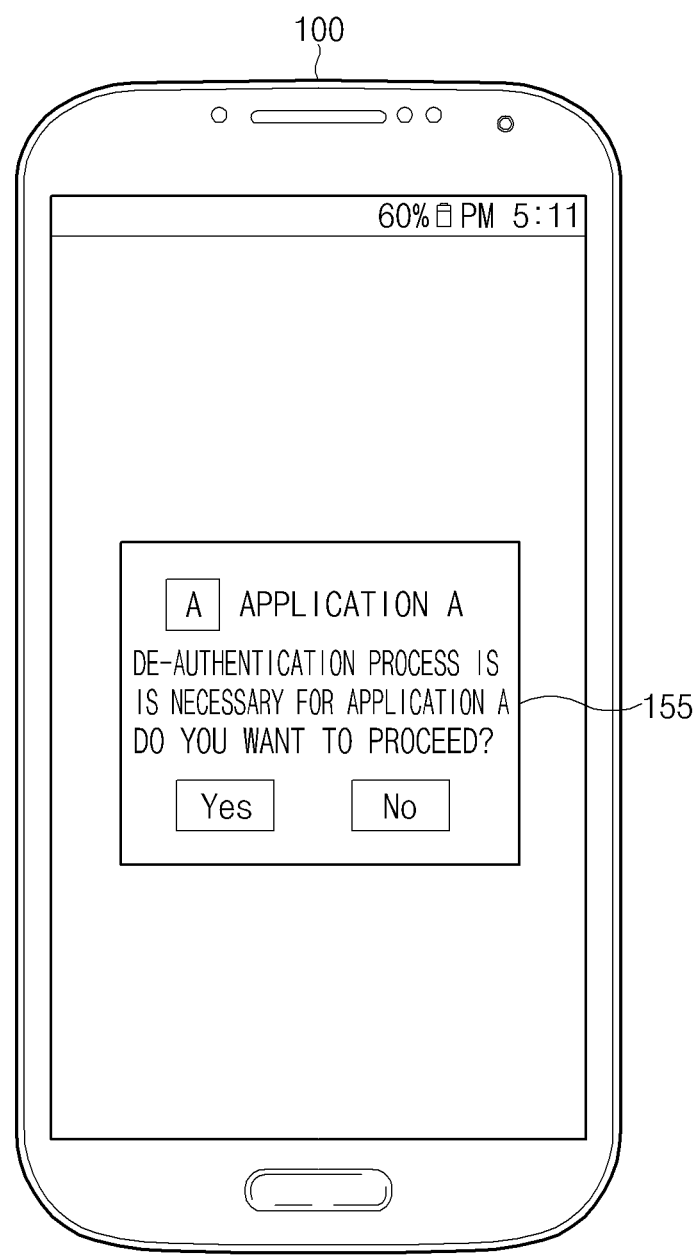
FIG. 4C is a diagram illustrating a third user interface related to factory reset of an electronic device according to an embodiment.

FIGS. 4A, 4B, and 4C are diagrams illustrating various user interfaces related to factory reset of an electronic device according to an embodiment. The user interfaces referred to in FIGS. 4A, 4B and 4C may be, for example, screens output in connection with settings for the operating system (or system) of the electronic device.

Referring to FIGS. 4A and 4B, a user of the electronic device 100 may recognize requirement for the factory reset of the electronic device 100 according to various purposes (e.g., second-hand sale of the electronic device 100, device change for the electronic device 100, or data cleanup of the electronic device 100). In this regard, the user may select a menu associated with, for example, backup and reset, of at least one menu on the screen which is related to the system settings of the electronic device 100. Accordingly, a first user interface 151 that is output may include a first object 10 supporting a process of device-wide reset of the electronic device 100 (or supporting a process of factory reset). When an input (e.g., a touch) is applied onto at least a portion on the first object 10 with a user's body or a specified electronic pen, the first user interface 151 may be switched to a second user interface 153. In various embodiments, the second user interface 153 may be an interface that is output based on the execution of the security application (e.g., SAMSUNG PASS) described above. For example, when a user input is applied onto the first object 10, the security application may be executed and the second user interface 153 may be output in a specified form (e.g., a pop-up window).

In one embodiment, the second user interface 153 may include at least one of first content (e.g., guide text) associated with the device-wide reset of the electronic device 100 and second content (e.g., an application item) associated with an application to be deleted on the electronic device 100 due to the device-wide reset. In one embodiment, the second user interface 153 may include a second object 30 supporting batch deletion processing (or the performance of factory reset of the electronic device) for at least one application according to the second content. When a user input is applied onto at least a portion of the second object 30, the processor 140 (FIG. 2A) may request de-authentication of the user certification information from a relevant external device based on the manage list 137 (FIG. 2C) as described above.

In various embodiments, when the second content includes identification information for the security application (e.g., an application name), the identification information of the security application (e.g., application A) may be subjected to separate display processing (e.g., grayscale processing or flicker processing) on the second user interface 153. Also, a third object 20 supporting the de-authentication of the user certification information of the corresponding application may be displayed on an area adjacent to the identification information for the security application.

Referring to FIGS. 4B and 4C, the user may approve the de-authentication of the user certification information associated with the security application on a third user interface 155 output according to a selection (or an application of the user input) for the third object 20 (e.g., apply a user input onto "Yes"). In this case, the third user interface 155 may be switched to the second user interface 153, and the identification information for the security application on the second user interface 153 may be not subjected to the separate display processing (e.g., grayscale processing or flicker processing). Accordingly, the user may select the second object 30 on the second user interface 153 to allow the device-wide reset of the electronic device 100 to be performed.

According to the above-described embodiments, an electronic device may include a communication module that performs communication with at least one external device, a memory that stores a list in which identification information for at least one security application involving user authentication is listed, and a processor electrically connected to the communication module and the memory, According to various embodiments, the processor may transmit information for factory reset to at least one external device associated with the security application based on the identification information on the list when a factory reset event of the electronic device occurs.

According to various embodiments, the electronic device may further include a sensor module configured to recognize a user's physical or behavioral characteristics in connection with the user authentication.

According to various embodiments, the processor may store user information obtained by the sensor module in a specified trust zone of the memory.

According to various embodiments, the processor may include at least one of a first function capable of accessing the trust zone or a second function capable of accessing areas of the memory other than the trust zone.

According to various embodiments, the processor may request the at least one external device to issue a certificate relating to the user authentication based on the user information, and store a certificate issued and provided from the at least one external device.

According to various embodiments, the processor may transmit at least one of first information functioning as a notification for the factory reset and second information functioning as a request for de-authentication of the certificate to the at least one external device.

According to various embodiments, the processor may perform the factory reset of the electronic device and delete the certificate when response information relating to the information for the factory reset is received from the at least one external device.

According to various embodiments, the processor may include package name information of the security application in the identification information when the identification information for the security application is listed in the list.

According to various embodiments, the processor may update the list to include the security application additionally installed or uninstalled on the electronic device.

According to various embodiments, the electronic device may further include a display.

According to various embodiments, the processor may allow the display to output at least one user interface supporting performance of the factory reset.

Figure 5A:
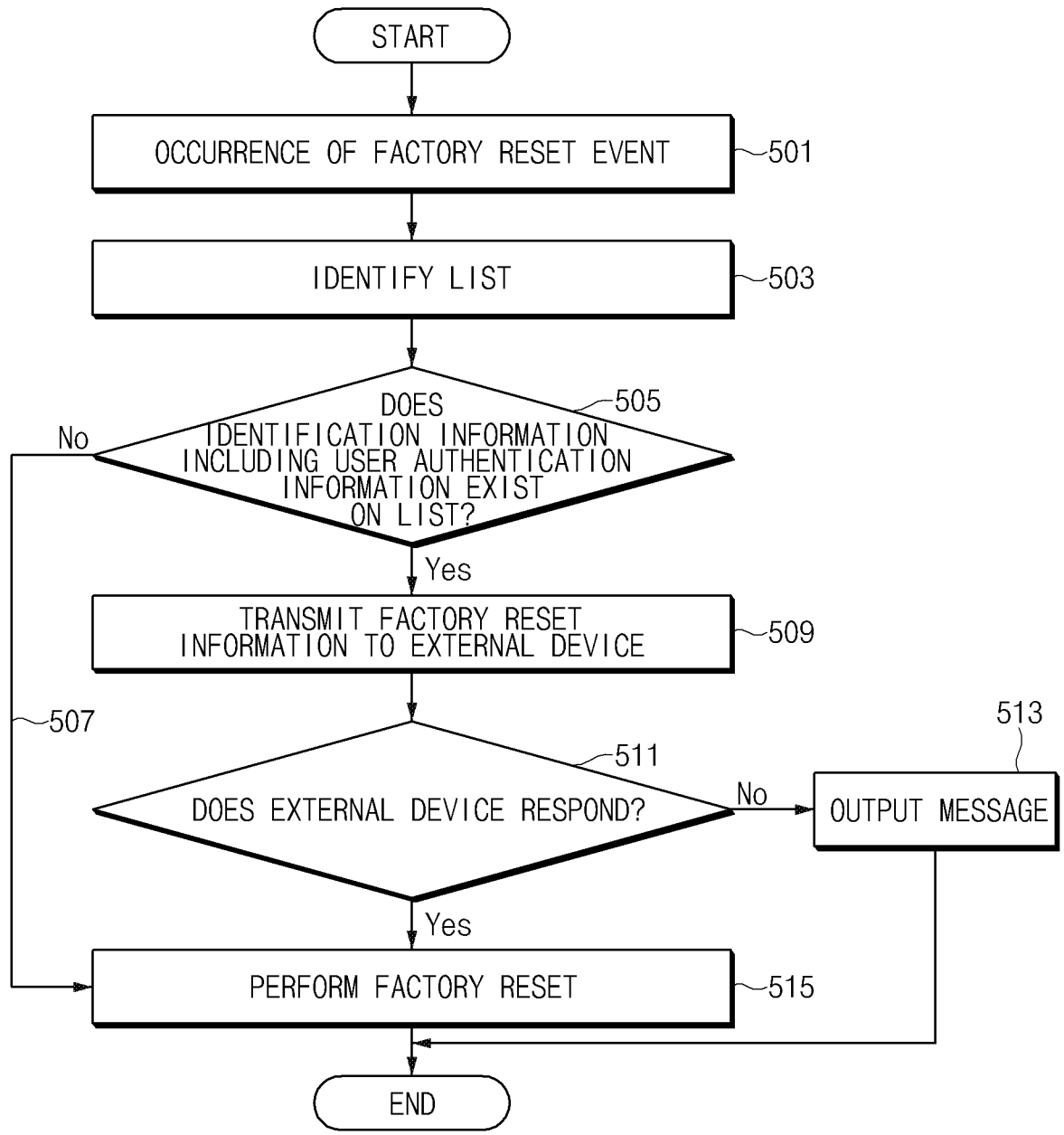
FIG. 5A is a diagram illustrating a factory reset process of an electronic device according to an embodiment.

FIG. 5A is a diagram illustrating a factory reset process of an electronic device according to an embodiment.

Referring to FIG. 5A, in operation 501, the processor 140 (FIG. 2) (e.g., the processor 620 of FIG. 6 or the processor 710 of FIG. 7) may detect a factory reset event of the electronic device 100 (FIG. 2) (e.g., the electronic device 601 of FIG. 6 or the electronic device 701 of FIG. 7) occurring according to user control (e.g., settings or system reset of the electronic device). For example, the processor 140 may receive a signal for a user input that controls device-wide reset on at least one user interface associated with the system settings of the electronic device 100 and detect occurrence of the factory reset event.

In operation 503, the processor 140 may access the memory 130 (FIG. 2) (e.g., the memory 630 of FIG. 6 or the memory 730 of FIG. 7) in response to the detection of occurrence of the event and request and obtain information on the manage list 137 (FIG. 2C) (e.g., address information of the manage list 137 in the memory 130) from the memory 130. In one embodiment, the manage list 137 may include identification information for at least one application provided or installed in the electronic device 100 (e.g., an application package name and/or user certification information relating to the application). The processor 140 may load the manage list 137 into a specified area of the memory 130 (e.g., an inactive area).

In operation 505, the processor 140 may determine whether or not the user certification information relating to the security application is included in the identification information on the manage list 137 and when the user certification information is not included in the identification information, in operation 507, determine the at least one application included in the manage list 137 to be an application irrelevant to security and process the performance of the factory reset.

When it is determined that the user certification information is included in the identification information in operation 505, in operation 509, the processor 140 may transmit first information notifying the performance of the factory reset of the electronic device 100 to an external device (e.g., an application developer server) corresponding to at least one application for which a process of performing de-authentication of the user certification information is necessary. In this operation, the processor 140 may further transmit second information requesting the de-authentication of the user certification information (or the certificate) to the external device.

In operation 511, the processor 140 may determine whether the external device responds to the first information and/or the second information. When no response information is received from the external device, in operation 513, the processor 140 may output a message notifying that the process of performing de-authentication of the user certification information has not been performed. Alternatively, when the response information relating to the de-authentication of the user certification information is received from the external device, in operation 515, the processor 140 may control the performance of a specified reset application to perform the factory reset of the electronic device 100.

Figure 5B:
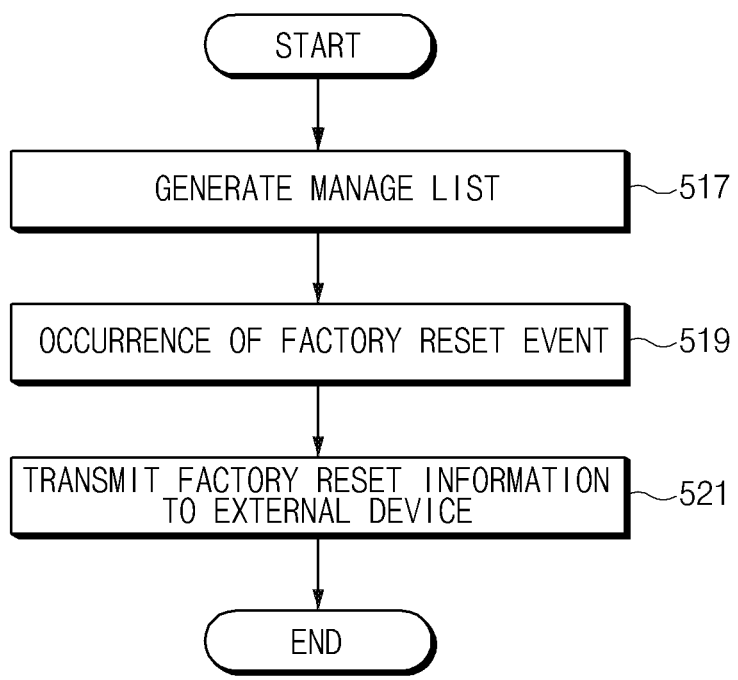
FIG. 5B is a diagram illustrating a method of managing identification information of an electronic device according to an embodiment.

FIG. 5B is a diagram illustrating a method of managing identification information of an electronic device according to an embodiment.

Referring to FIG. 5B, in operation 517, the processor 140 (FIG. 2) (e.g., the processor 620 of FIG. 6 or the processor 710 of FIG. 7) may generate the manage list 137 for at least one application that has been provided or installed on the electronic device 100 (FIG. 2) (e.g., the electronic device 601 of FIG. 6 or the electronic device 701 of FIG. 7). In one embodiment, the processor 140 may include all of the applications on the electronic device 100 in the manage list 137 or include only a security application involving specified user certification (e.g., biometric certification) (or a certificate) in the manage list 137. The processor 140 may obtain identification information (e.g., the package name of the application) for the application from the memory 130 (e.g., the memory 630 of FIG. 6 or the memory 730 of FIG. 7), and map and list the application into the identification information of the application in the manage list 137. In one embodiment, the processor 140 may include user biometric certification information or user authorized certification information stored in the trust zone 133 (FIG. 2B or FIG. 2C) of the memory 130 as identification information for the security application. The processor 140 may also include information on whether a process of performing de-authentication of user certification (or certificate) according to the factory reset (or settings or system reset) of the electronic device 100 is necessary as identification information of the security application.

In operation 519, the processor 140 may detect a factory reset event that occurs in response to user control on the electronic device 100. For example, when a user controls the factory reset of the electronic device 100 on a user interface associated with the factory reset, the processor 140 may receive a signal according to the user control to detect the factory reset event of the electronic device 100. In one embodiment, the processor 140 may load the generated manage list 137 into a specified area (e.g., an inactive area) of the memory 130, in response to detection of the factory reset event.

In operation 521, the processor 140 may perform processing for the manage list 137 according to an instruction defined in an authentication application (e.g., SAMSUNG PASS) that supports user biometric authentication. For example, the processor 140 may determine at least one application for which a process of performing de-authentication of the user certification (or certificate) according to factory reset is necessary by referring to the application identification information listed in the manage list 137. The processor 140 may transmit information on the determined application to the authentication application, and control the authentication application to transmit specified information to an external device (e.g., an application developer server) related to the determined application. The specified information may include, for example, at least one of first information notifying the performance of the factory reset of the electronic device 100 or second information requesting de-authentication of the user certification information.

According to the above-described embodiments, a method for managing information of an electronic device may include generating a list including identification information for at least one security application involving user authentication, detecting occurrence of a factory reset event of the electronic device, and transmitting information for factory reset to at least one external device associated with the security application based on the identification information on the list when the occurrence of the factory reset event is detected.

According to various embodiments, the method may further include obtaining a user's physical or behavioral characteristic information.

According to various embodiments, the method may further include storing the obtained user's physical or behavioral characteristic information in a specified trust zone.

According to various embodiments, the obtaining of the user's physical or behavioral characteristic information may include requesting the at least one external device to issue a certificate relating to the user authentication based on the user's physical or behavioral characteristic information; and According to various embodiments, the obtaining of the user's physical or behavioral characteristic information may include storing the certificate issued and provided from the at least one external device.

According to various embodiments, the transmitting of the information may include transmitting at least one of first information functioning as a notification for the factory reset and second information functioning as a request for de-authentication for the certificate to the at least one external device.

According to various embodiments, the method may further include receiving response information relating to the information for the factory reset from the at least one external device.

According to various embodiments, the method may further include outputting a specified message when no response information relating to the information for the factory reset is provided from the at least one external device.

According to various embodiments, the receiving of the response information includes deleting information relating to the user authentication for the security application on the electronic device.

According to various embodiments, the generating of the list may include including package name information for the security application as a part of the identification information.

According to various embodiments, the generating of the list may include updating the list for the security application additionally installed or uninstalled on the electronic device.

According to various embodiments, the method may further include outputting at least one user interface supporting performance of the factory reset.

FIG. 6 is a diagram illustrating an electronic device in a network environment according to an embodiment.

Referring to FIG. 6, according to various embodiments, an electronic device 601, a first electronic device 602, a second electronic device 604, or a server 606 may be connected to each other through a network 662 or short range communication 664. The electronic device 601 may include a bus 610, a processor 620, a memory 630, an input/output interface 650, a display 660, and a communication interface 670. According to an embodiment, the electronic device 601 may not include at least one of the above-described elements or may further include other element(s).

The bus 610 may include a circuit for connecting the above-mentioned elements 610 to 670 to each other and transferring communications (e.g., control messages and/or data) among the above-mentioned elements.

The processor 620 may include at least one of a central processing unit (CPU), an application processor (AP), or a communication processor (CP). The processor 620 may perform data processing or an operation related to communication and/or control of at least one of the other elements of the electronic device 601.

The memory 630 may include a volatile memory and/or a nonvolatile memory. The memory 630 may store instructions or data related to at least one of the other elements of the electronic device 601. According to an embodiment of the present disclosure, the memory 630 may store software and/or a program 640. The program 640 may include, for example, a kernel 641, a middleware 643, an application programming interface (API) 645, and/or an application program (or an application) 647. At least a portion of the kernel 641, the middleware 643, or the API 645 may be referred to as an operating system (OS).

The kernel 641 may control or manage system resources (e.g., the bus 610, the processor 620, the memory 630, or the like) used to perform operations or functions of other programs (e.g., the middleware 643, the API 645, or the application program 647). Furthermore, the kernel 641 may provide an interface for allowing the middleware 643, the API 645, or the application program 647 to access individual elements of the electronic device 601 in order to control or manage the system resources.

The middleware 643 may serve as an intermediary so that the API 645 or the application program 647 communicates and exchanges data with the kernel 641.

Furthermore, the middleware 643 may handle one or more task requests received from the application program 647 according to a priority order. For example, the middleware 643 may assign at least one application program 647 a priority for using the system resources (e.g., the bus 610, the processor 620, the memory 630, or the like) of the electronic device 601. For example, the middleware 643 may handle the one or more task requests according to the priority assigned to the at least one application, thereby performing scheduling or load balancing with respect to the one or more task requests.

The API 645, which is an interface for allowing the application 647 to control a function provided by the kernel 641 or the middleware 643, may include, for example, at least one interface or function (e.g., instructions) for file control, window control, image processing, character control, or the like.

The input/output interface 650 may serve to transfer an instruction or data input from a user or another external device to (an)other element(s) of the electronic device 601. Furthermore, the input/output interface 650 may output instructions or data received from (an)other element(s) of the electronic device 601 to the user or another external device.

The display 660 may include, for example, a liquid crystal display (LCD), a light-emitting diode (LED) display, an organic light-emitting diode (OLED) display, a microelectromechanical systems (MEMS) display, or an electronic paper display. The display 660 may present various content (e.g., a text, an image, a video, an icon, a symbol, or the like) to the user. The display 660 may include a touch screen, and may receive a touch, gesture, proximity or hovering input from an electronic pen or a part of a body of the user.

The communication interface 670 may set communications between the electronic device 601 and an external device (e.g., a first external electronic device 602, a second external electronic device 604, or a server 606). For example, the communication interface 670 may be connected to a network 662 via wireless communications or wired communications so as to communicate with the external device (e.g., the second external electronic device 604 or the server 606).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 664. The short-range communications may include at least one of wireless fidelity (Wi-Fi), Bluetooth, near field communication (NFC), magnetic stripe transmission (MST), or GNSS.

The MST may generate pulses according to transmission data and the pulses may generate electromagnetic signals. The electronic device 601 may transmit the electromagnetic signals to a reader device such as a POS (point of sales) device. The POS device may detect the electromagnetic signals by using a MST reader and restore data by converting the detected electromagnetic signals into electrical signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 232 (RS-232), plain old telephone service (POTS), or the like. The network 662 may include at least one of telecommunications networks, for example, a computer network (e.g., local area network (LAN) or wide area network (WAN)), the Internet, or a telephone network.

The types of the first external electronic device 602 and the second external electronic device 604 may be the same as or different from the type of the electronic device 601. According to an embodiment of the present disclosure, the server 606 may include a group of one or more servers. A portion or all of operations performed in the electronic device 601 may be performed in one or more other electronic devices (e.g., the first electronic device 602, the second external electronic device 604, or the server 606). When the electronic device 601 should perform a certain function or service automatically or in response to a request, the electronic device 601 may request at least a portion of functions related to the function or service from another device (e.g., the first electronic device 602, the second external electronic device 604, or the server 606) instead of or in addition to performing the function or service for itself. The other electronic device (e.g., the first electronic device 602, the second external electronic device 604, or the server 606) may perform the requested function or additional function, and may transfer a result of the performance to the electronic device 601. The electronic device 601 may use a received result itself or additionally process the received result to provide the requested function or service. To this end, for example, a cloud computing technology, a distributed computing technology, or a client-server computing technology may be used.

FIG. 7 is a diagram illustrating a block diagram of an electronic device according to an embodiment.

Referring to FIG. 7, the electronic device 701 may include, for example, all or part of an electronic device 601 shown in FIG. 6. The electronic device 701 may include one or more processors 710 (e.g., application processors (APs)), a communication module 720, a subscriber identification module (SIM) 729, a memory 730, a security module 736, a sensor module 740, an input device 750, a display 760, an interface 770, an audio module 780, a camera module 791, a power management module 795, a battery 796, an indicator 797, and a motor 798.

The processor 710 may drive, for example, an operating system (OS) or an application program to control a plurality of hardware or software components connected thereto and may process and compute a variety of data. The processor 710 may be implemented with, for example, a system on chip (SoC). According to an embodiment of the present disclosure, the processor 710 may include a graphic processing unit (GPU) (not shown) and/or an image signal processor (not shown). The processor 710 may include at least some (e.g., a cellular module 721) of the components shown in FIG. 7. The processor 710 may load a command or data received from at least one of other components (e.g., a non-volatile memory) into a volatile memory to process the data and may store various data in a non-volatile memory.

The communication module 720 may have the same or similar configuration to the communication interface 670 of FIG. 6. The communication module 720 may include, for example, the cellular module 721, a wireless-fidelity (Wi-Fi) module 722, a Bluetooth (BT) module 723, a global navigation satellite system (GNSS) module 724 (e.g., a GPS module, a Glonass module, a Beidou module, or a Galileo module), a near field communication (NFC) module 725, an MST module 726, and a radio frequency (RF) module 727.

The cellular module 721 may provide, for example, a voice call service, a video call service, a text message service, or an Internet service, and the like through a communication network. According to an embodiment of the present disclosure, the cellular module 721 may identify and authenticate the electronic device 701 in a communication network using the SIM 729 (e.g., a SIM card). According to an embodiment of the present disclosure, the cellular module 721 may perform at least part of functions which may be provided by the processor 710. According to an embodiment of the present disclosure, the cellular module 721 may include a communication processor (CP).

The Wi-Fi module 722, the BT module 723, the GNSS module 724, the NFC module 725, or the MST module 726 may include, for example, a processor for processing data transmitted and received through the corresponding module. According to various embodiments of the present disclosure, at least some (e.g., two or more) of the cellular module 721, the Wi-Fi module 722, the BT module 723, the GNSS module 724, the NFC module 725, or the MST module 726 may be included in one integrated chip (IC) or one IC package.

The RF module 727 may transmit and receive, for example, a communication signal (e.g., an RF signal). Though not shown, the RF module 727 may include, for example, a transceiver, a power amplifier module (PAM), a frequency filter, or a low noise amplifier (LNA), or an antenna, and the like. According to another embodiment of the present disclosure, at least one of the cellular module 721, the Wi-Fi module 722, the BT module 723, the GNSS module 724, the NFC module 725, or the MST module 726 may transmit and receive an RF signal through a separate RF module.

The SIM 729 may include, for example, a card which includes a SIM and/or an embedded SIM. The SIM 729 may include unique identification information (e.g., an integrated circuit card identifier (ICCID)) or subscriber information (e.g., an international mobile subscriber identity (IMSI)).

The memory 730 (e.g., a memory 630 of FIG. 6) may include, for example, an embedded memory 732 or an external memory 734. The embedded memory 732 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 734 may include a flash drive, for example, a compact flash (CF), a secure digital (SD), a micro-SD, a mini-SD, an extreme digital (xD), a multimedia card (MMC), or a memory stick, and the like. The external memory 734 may operatively and/or physically connect with the electronic device 701 through various interfaces.

The security module 736 may be a module which has a relatively higher secure level than the memory 730 and may be a circuit which stores secure data and guarantees a protected execution environment. The security module 736 may be implemented with a separate circuit and may include a separate processor. The security module 736 may include, for example, an embedded secure element (eSE) which is present in a removable smart chip or a removable SD card or is embedded in a fixed chip of the electronic device 701. Also, the security module 736 may be driven by an OS different from the OS of the electronic device 701. For example, the security module 736 may operate based on a java card open platform (JCOP) OS.

The sensor module 740 may measure, for example, a physical quantity or may detect an operation state of the electronic device 701, and may convert the measured or detected information to an electric signal. The sensor module 740 may include at least one of, for example, a gesture sensor 740A, a gyro sensor 740B, a barometric pressure sensor 740C, a magnetic sensor 740D, an acceleration sensor 740E, a grip sensor 740F, a proximity sensor 740G, a color sensor 740H (e.g., red, green, blue (RGB) sensor), a biometric sensor 740I, a temperature/humidity sensor 740J, an illumination sensor 740K, or an ultraviolet (UV) sensor 740M. Additionally or alternatively, the sensor module 740 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 740 may further include a control circuit for controlling at least one or more sensors included therein. According to various embodiments of the present disclosure, the electronic device 701 may further include a processor configured to control the sensor module 740, as part of the processor 710 or to be independent of the processor 710. While the processor 710 is in a sleep state, the electronic device 701 may control the sensor module 740.

The input device 750 may include, for example, a touch panel 752, a (digital) pen sensor 754, a key 756, or an ultrasonic input device 758. The touch panel 752 may use at least one of, for example, a capacitive type, a resistive type, an infrared type, or an ultrasonic type. Also, the touch panel 752 may further include a control circuit. The touch panel 752 may further include a tactile layer and may provide a tactile reaction to a user.

The (digital) pen sensor 754 may be, for example, part of the touch panel 752 or may include a separate sheet for recognition. The key 756 may include, for example, a physical button, an optical key, or a keypad. The ultrasonic input device 758 may allow the electronic device 701 to detect a sound wave using a microphone (e.g., a microphone 788) and to verify data through an input tool generating an ultrasonic signal.

The display 760 (e.g., a display 660 of FIG. 6) may include a panel 762, a hologram device 764, or a projector 766. The panel 762 may include the same or similar configuration to the display 760. The panel 762 may be implemented to be, for example, flexible, transparent, or wearable. The panel 762 and the touch panel 752 may be integrated into one module. The hologram device 764 may show a stereoscopic image in a space using interference of light. The projector 766 may project light onto a screen to display an image. The screen may be positioned, for example, inside or outside the electronic device 701. According to an embodiment of the present disclosure, the display 760 may further include a control circuit for controlling the panel 762, the hologram device 764, or the projector 766.

The interface 770 may include, for example, a high-definition multimedia interface (HDMI) 772, a universal serial bus (USB) 774, an optical interface 776, or a D-subminiature 778. The interface 770 may be included in, for example, the communication interface 670 shown in FIG. 6. Additionally or alternatively, the interface 770 may include, for example, a mobile high definition link (MHL) interface, an SD card/multimedia card (MMC) interface, or an infrared data association (IrDA) standard interface.

The audio module 780 may convert a sound and an electric signal in dual directions. At least part of components of the audio module 780 may be included in, for example, an input and output interface 650 (or a user interface) shown in FIG. 6. The audio module 780 may process sound information input or output through, for example, a speaker 782, a receiver 784, an earphone 786, or the microphone 788, and the like.

The camera module 791 may be a device which captures a still image and a moving image. According to an embodiment of the present disclosure, the camera module 791 may include one or more image sensors (not shown) (e.g., a front sensor or a rear sensor), a lens (not shown), an image signal processor (ISP) (not shown), or a flash (not shown) (e.g., an LED or a xenon lamp).

The power management module 795 may manage, for example, power of the electronic device 701. According to an embodiment of the present disclosure, though not shown, the power management module 795 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 796 and voltage, current, or temperature thereof while the battery 796 is charged. The battery 796 may include, for example, a rechargeable battery or a solar battery.

The indicator 797 may display a specific state of the electronic device 701 or part (e.g., the processor 710) thereof, for example, a booting state, a message state, or a charging state, and the like. The motor 798 may convert an electric signal into mechanical vibration and may generate vibration or a haptic effect, and the like. Though not shown, the electronic device 701 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a MediaFLO™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

Figure 8:
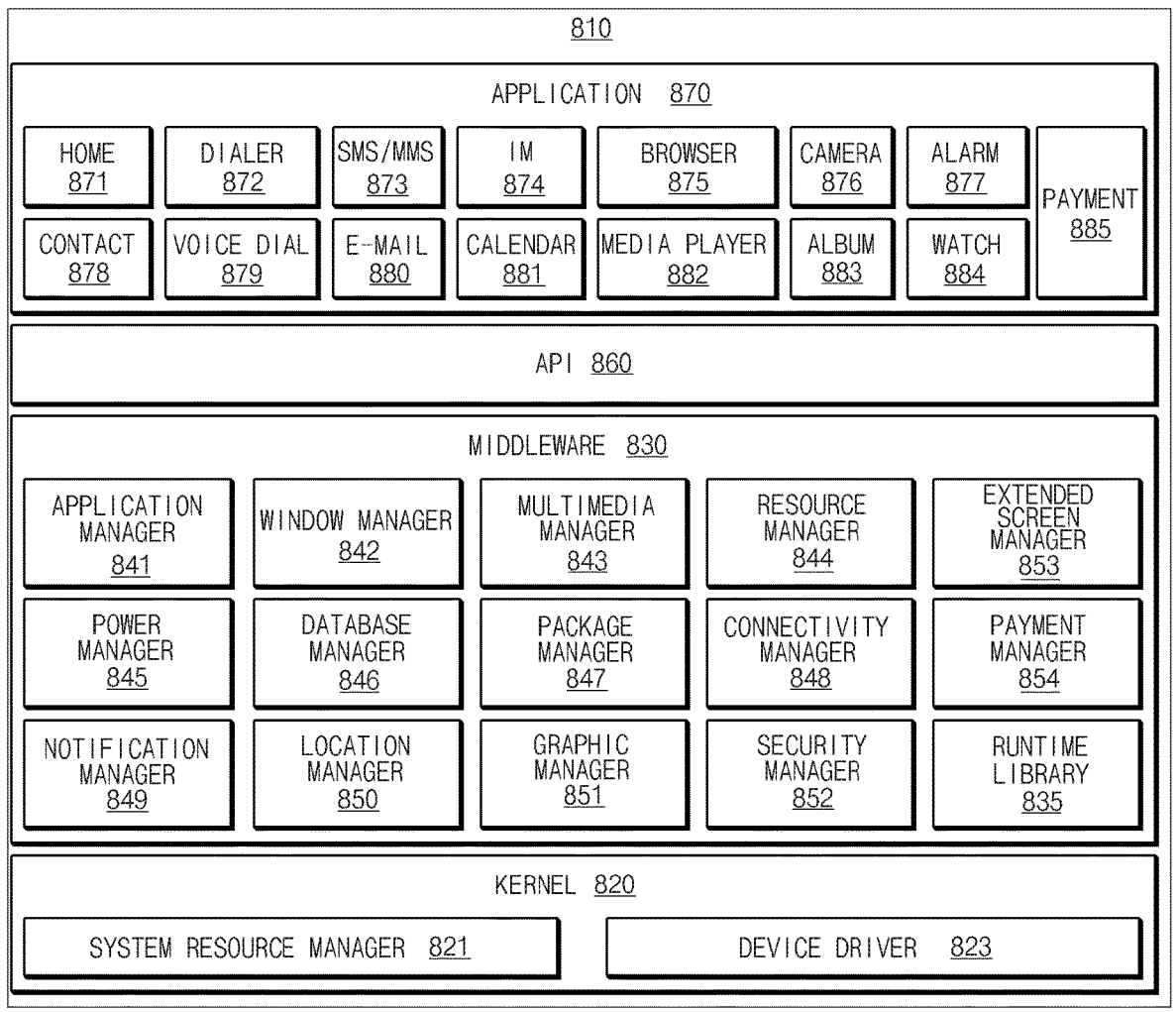
FIG. 8 is a diagram illustrating a program module of an electronic device according to an embodiment.

FIG. 8 is a diagram illustrating a program module of an electronic device according to an embodiment.

According to an embodiment of the present disclosure, the program module 810 (e.g., a program 640 of FIG. 6) may include an operating system (OS) for controlling resources associated with an electronic device (e.g., an electronic device 601 of FIG. 6) and/or various applications (e.g., an application program 647 of FIG. 6) which are executed on the OS. The OS may be, for example, Android, iOS, Windows, Symbian, Tizen, or Bada, and the like.

The program module 810 may include a kernel 820, a middleware 830, an application programming interface (API) 860, and/or an application 870. At least part of the program module 810 may be preloaded on the electronic device, or may be downloaded from an external electronic device (e.g., a first external electronic device 602, a second external electronic device 604, or a server 606, and the like of FIG. 6).

The kernel 820 (e.g., a kernel 641 of FIG. 6) may include, for example, a system resource manager 821 and/or a device driver 823. The system resource manager 821 may control, assign, or collect, and the like system resources. According to an embodiment of the present disclosure, the system resource manager 821 may include a process management unit, a memory management unit, or a file system management unit, and the like. The device driver 823 may include, for example, a display driver, a camera driver, a Bluetooth (BT) driver, a shared memory driver, a universal serial bus (USB) driver, a keypad driver, a wireless-fidelity (Wi-Fi) driver, an audio driver, or an inter-process communication (IPC) driver.

The middleware 830 (e.g., a middleware 643 of FIG. 6) may provide, for example, functions the application 870 needs in common, and may provide various functions to the application 870 through the API 860 such that the application 870 efficiently uses limited system resources in the electronic device. According to an embodiment of the present disclosure, the middleware 830 (e.g., the middleware 643) may include at least one of a runtime library 835, an application manager 841, a window manager 842, a multimedia manager 843, a resource manager 844, a power manager 845, a database manager 846, a package manager 847, a connectivity manager 848, a notification manager 849, a location manager 850, a graphic manager 851, a security manager 852, an extended screen manager 853, or a payment manager 854.

The runtime library 835 may include, for example, a library module used by a compiler to add a new function through a programming language while the application 870 is executed. The runtime library 835 may perform a function about input and output management, memory management, or an arithmetic function.

The application manager 841 may manage, for example, a life cycle of at least one of the application 870. The window manager 842 may manage graphic user interface (GUI) resources used on a screen of the electronic device. The multimedia manager 843 may determine a format utilized for reproducing various media files and may encode or decode a media file using a codec corresponding to the corresponding format. The resource manager 844 may manage source codes of at least one of the application 870, and may manage resources of a memory or a storage space, and the like.

The power manager 845 may act together with, for example, a basic input/output system (BIOS) and the like, may manage a battery or a power source, and may provide power information utilized for an operation of the electronic device. The database manager 846 may generate, search, or change a database to be used in at least one of the application 870. The package manager 847 may manage installation or update of an application distributed by a type of a package file.

The connectivity manager 848 may manage, for example, wireless connection such as Wi-Fi connection or BT connection, and the like. The notification manager 849 may display or notify events, such as an arrival message, an appointment, and proximity notification, by a method which is not disturbed to the user. The location manager 850 may manage location information of the electronic device. The graphic manager 851 may manage a graphic effect to be provided to the user or a user interface (UI) related to the graphic effect. The security manager 852 may provide all security functions utilized for system security or user authentication, and the like. According to an embodiment, the extended screen manager 853 may manage information to be provided, a graphic effect, or a UI associated with the information to be provided or the graphic effect, through the area of a display determined such that a graphic image is displayed.

According to an embodiment of the present disclosure, when the electronic device (e.g., an electronic device 601 of FIG. 6) has a phone function, the middleware 830 may further include a telephony manager (not shown) for managing a voice or video communication function of the electronic device. The middleware 830 may include a middleware module which configures combinations of various functions of the above-described components. The middleware 830 may provide a module which specializes according to kinds of OSs to provide a differentiated function. Also, the middleware 830 may dynamically delete some of old components or may add new components.

The API 860 (e.g., an API 645 of FIG. 6) may be, for example, a set of API programming functions, and may be provided with different components according to OSs. For example, in case of Android or iOS, one API set may be provided according to platforms. In case of Tizen, two or more API sets may be provided according to platforms.

The application 870 (e.g., an application program 647 of FIG. 6) may include one or more of, for example, a home application 871, a dialer application 872, a short message service/multimedia message service (SMS/MMS) application 873, an instant message (IM) application 874, a browser application 875, a camera application 876, an alarm application 877, a contact application 878, a voice dial application 879, an e-mail application 880, a calendar application 881, a media player application 882, an album application 883, a watch application 884, a payment application 885, a health care application (e.g., an application for measuring quantity of exercise or blood sugar, and the like), or an environment information application (e.g., an application for providing atmospheric pressure information, humidity information, or temperature information, and the like), and the like.

According to an embodiment of the present disclosure, the application 870 may include an application (hereinafter, for better understanding and ease of description, referred to as "information exchange application") for exchanging information between the electronic device (e.g., the electronic device 601 of FIG. 6) and an external electronic device (e.g., the first external electronic device 602 or the second external electronic device 604). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the first external electronic device 602 or the second external electronic device 604). Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the first external electronic device 602 or the second external electronic device 604) which communicates with the electronic device, an application which operates in the external electronic device, or a service (e.g., a call service or a message service) provided from the external electronic device.

According to an embodiment of the present disclosure, the application 870 may include an application (e.g., the health care application of a mobile medical device) which is preset according to attributes of the external electronic device (e.g., the first external electronic device 602 or the second external electronic device 604). According to an embodiment of the present disclosure, the application 870 may include an application received from the external electronic device (e.g., the server 606, the first external electronic device 602, or the second external electronic device 604). According to an embodiment of the present disclosure, the application 870 may include a preloaded application or a third party application which may be downloaded from a server. Names of the components of the program module 810 according to various embodiments of the present disclosure may differ according to kinds of OSs.

According to various embodiments of the present disclosure, at least part of the program module 810 may be implemented with software, firmware, hardware, or at least two or more combinations thereof. At least part of the program module 810 may be implemented (e.g., executed) by, for example, a processor (e.g., a processor 710). At least part of the program module 810 may include, for example, a module, a program, a routine, sets of instructions, or a process, and the like for performing one or more functions.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 620), the processor may perform functions corresponding to the instructions. The computer-readable storage medium may be, for example, the memory 630.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments may be composed of single entity or a plurality of entities, a part of the above-described sub-components may be omitted, or other sub-components may be further included. According to various embodiments, operations executed by modules, program modules, or other components may be executed by a successive method, a parallel method, a repeated method, or a heuristic method, or at least one part of operations may be executed in different sequences or omitted. Alternatively, other operations may be added.

The embodiments disclosed herein are provided to easily describe technical details of the disclosure and to help the understanding of the disclosure, and are not intended to limit the scope of the disclosure. Therefore, it should be construed that all modifications and changes or various other embodiments based on the technical idea of the disclosure fall within the scope of the disclosure.

The invention claimed is:

1. An electronic device comprising:
   a communication circuitry configured to perform communication with at least one external device;
   a memory configured to store a list in which identification information for at least one security application involving user authentication is listed;
   a sensor module configured to recognize a user's physical or behavioral characteristics in connection with the user authentication; and
   a processor electrically connected to the communication circuitry and the memory,
   wherein the processor is configured to:
   request the at least one external device to issue a certificate relating to the user authentication based on user information obtained by the sensor module,
   receive the certificate from the at least one external device, and
   store the user information and the certificate issued and provided from the at least one external device in a specified trust zone of the memory,
   wherein the processor is further configured to transmit at least one of first information notifying performance of factory reset of the electronic device and second information requesting de-authentication for the certificate to at least one external device associated with the at least one security application based on the identification information on the list when a factory reset event of the electronic device occurs, and
   wherein the processor is further configured to perform the factory reset of the electronic device and delete the certificate when response information relating to the factory reset is received from the at least one external device.

2. The electronic device of claim 1, wherein the processor is configured to update the list to include a security application additionally installed or uninstalled on the electronic device.

3. The electronic device of claim 1, further comprising:
   a display,
   wherein the processor is configured to allow the display to output at least one user interface supporting performance of the factory reset.

4. A method for managing information of an electronic device, comprising:
   obtaining a user's physical or behavioral characteristic information through a sensor module of the electronic device;
   request at least one external device to issue a certificate relating to user authentication based on the user's physical or behavioral characteristic information;
   storing obtained user's physical or behavioral characteristic information and the certificate issued and provided from the at least one external device in a memory of the electronic device;
   generating a list including identification information for at least one security application involving user authentication;
   detecting occurrence of a factory reset event of the electronic device;
   transmitting at least one of first information notifying performance of factory reset of the electronic device and second information requesting de-authentication for the certificate to at least one external device associated with the at least one security application based on the identification information on the list when the occurrence of the factory reset event is detected; and
   performing the factory reset of the electronic device and delete the certificate when response information relating to the factory reset is received from the at least one external device.

5. The method of claim 4, further comprising:
outputting a specified message when no response information relating to the factory reset is provided from the at least one external device.

6. The method of claim 4, deleting information relating to user authentication for the security application on the electronic device when the response information relating to the factory reset is received from the at least one external device.

7. The method of claim 4, further comprising:
outputting at least one user interface supporting performance of the factory reset.

* * * * *